United States Patent
Romagnoli

Patent Number: 5,292,431
Date of Patent: Mar. 8, 1994

[54] PRESSURIZED PERCOLATING FILTER OF THE TYPE USED FOR THE REGENERATION OF WATER IN AQUARIUMS

[76] Inventor: Silvestro Romagnoli, Via Nomentana, 322 - I-00141, Roma, Italy

[21] Appl. No.: 994,323

[22] Filed: Dec. 21, 1992

[30] Foreign Application Priority Data

Jan. 20, 1992 [IT] Italy .................. RM92 A 000041

[51] Int. Cl.$^5$ ............................................. A01K 63/04
[52] U.S. Cl. .................................. 210/127; 210/150; 210/169; 210/416.2; 119/260
[58] Field of Search ............... 210/123, 127, 150, 151, 210/169, 416.2, 418; 119/5

[56] References Cited

U.S. PATENT DOCUMENTS

| | | | |
|---|---|---|---|
| 2,729,337 | 1/1956 | Alferman | 210/169 |
| 4,076,619 | 2/1978 | Howery | 210/169 |
| 5,098,585 | 3/1992 | Woltman et al. | 210/169 |
| 5,108,594 | 4/1992 | Giovanetti et al. | 210/416.2 |

FOREIGN PATENT DOCUMENTS

| | | |
|---|---|---|
| 0445491 | 9/1991 | European Pat. Off. |
| 2705070 | 8/1978 | Fed. Rep. of Germany |
| 3638239 | 5/1988 | Fed. Rep. of Germany |
| 3805770 | 9/1989 | Fed. Rep. of Germany |
| 2057416 | 1/1981 | United Kingdom |
| 2131710 | 6/1984 | United Kingdom |

Primary Examiner—Stanley S. Silverman
Assistant Examiner—Robert James Popovics
Attorney, Agent, or Firm—Darby & Darby

[57] ABSTRACT

A pressurized percolating filter, of the type used for the regeneration of water in aquariums, comprising, a closed receptacle (1), having: a prefiltering chamber (2), defined by a perforated bottom (3) equipped with a uniform plurality of perforations (3c), an intermediate chamber (4), a percolation chamber (5), and a collection chamber (7) for the regenerated water-communicating with an aquarium tub (8) by means of a feed pipe (9). A mixture of air and water to be regenerated is fed from a single leader pipe (10) to the prefiltering chamber (2). The prefiltering chamber (2) comprises in the perforated bottom (3) a small tub (3a): equipped at its bottom with a smaller number of calibrated perforations (3b) than those (3c) in the perforated bottom (3), and equipped with a float valve (12) controlling an inflow perforation (13).

7 Claims, 1 Drawing Sheet

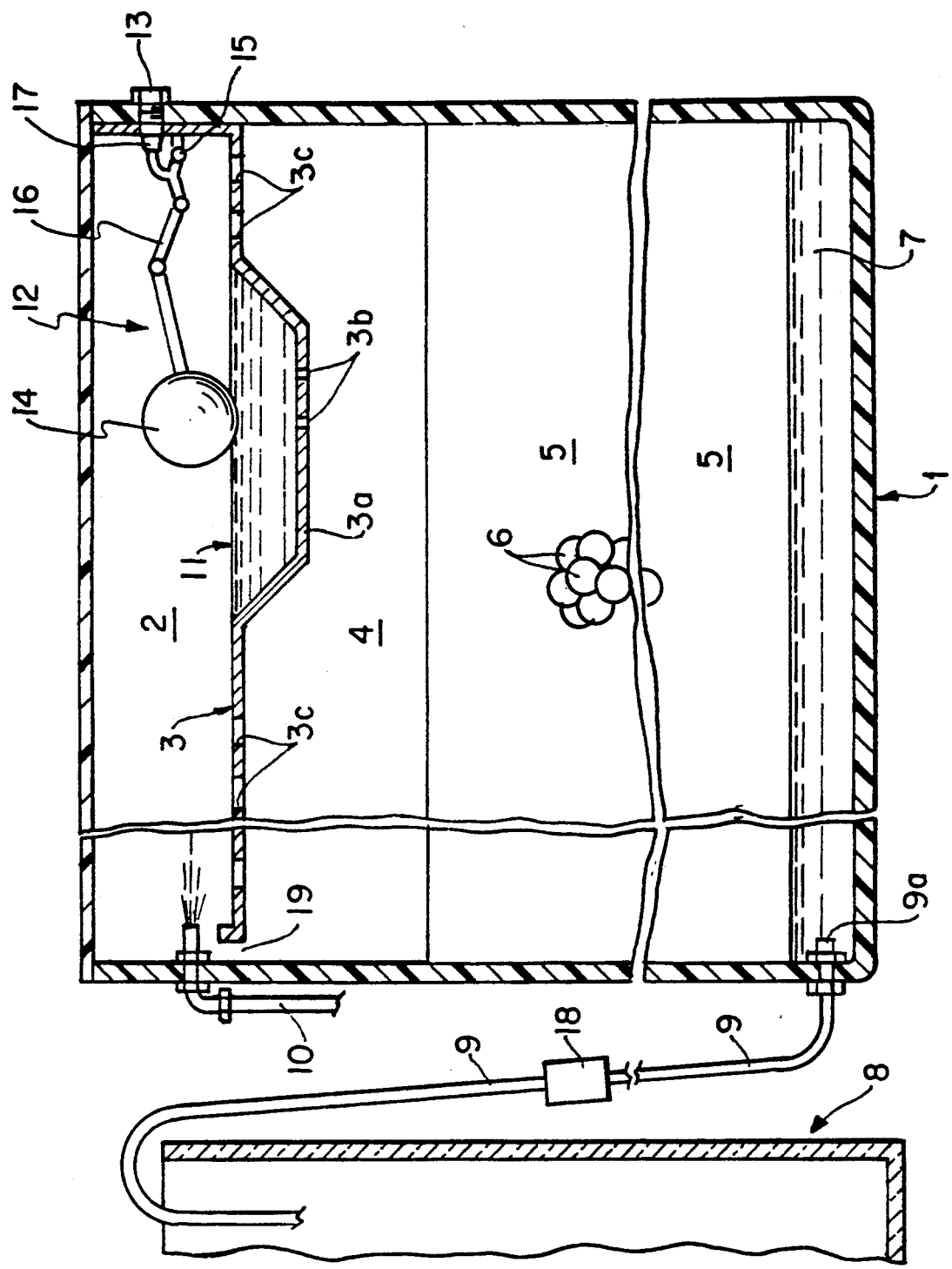

PRESSURIZED PERCOLATING FILTER OF THE TYPE USED FOR THE REGENERATION OF WATER IN AQUARIUMS

BACKGROUND OF THE INVENTION

The invention relates to a pressurized percolating filter of the type used for the regeneration of water in aquariums.

The regeneration or purification of water comprises a biological-bacterial filtering, obtained by making the water run through a percolating support or substratus on which aerobic bacteria colonize and decompose polluting substances.

The aerobic bacteria, while biologically decomposing the polluting substances, consume a large quantity of oxygen, making it necessary to provide them with as much oxygen as possible.

In known percolating filters the water, running finely on the substratus, becomes well oxygenated on contact with air present inside the filter. Still, in order to improve the efficiency of the filter it has been considered necessary to increase the oxygenation of the water.

Presently, for this goal an oxygen reactor is used, consisting of an apparatus where the percolating substratus is crossed by the water. In order that the absorption of oxygen is guaranteed to be of the highest possible level, the reactor is permanently fed with new air through an aerator which continuously renews the air. By regulating the flow of both the water and the air, an increase in atmospheric pressure is obtained internally to the filtering chamber which permits a greater solubility of the oxygen in the water, so as to obtain high values of saturation and thus benefit the aerobic bacteria.

However, a percolator filter associated with an oxygen reactor of the type described, even if efficient, is certainly expensive and complex, and limited in its practical application by the necessity to predispose safety systems which intervene in case of malfunctioning of the aerator or other parts of the reactor to prevent the death by asphyxia of the bacterial colony.

The present invention aims to eliminate the above-mentioned inconveniences.

An aim of the present invention is to provide a percolating filter of small dimensions, that is simply constructed, able to provide superior filtering performance, simple in its functioning, and requires little maintenance.

SUMMARY OF THE INVENTION

The invention solves the problems in the prior art by providing a pressurized percolating filter of the type used for the regeneration of water in aquariums. In a closed receptacle, starting from the top and moving downwards, the invention comprises a prefiltering chamber defined by a perforated bottom, an intermediate chamber, a percolation chamber filled with spheres or similar conventional elements made of plastic for the settling of bacterial colonies, and a collection chamber for collecting the regenerated water communicated with an aquarium tank by means of a feed pipe. The prefiltering chamber is fed with a mixture of air and water to be regenerated through a single leader pipe from the outside by a pump. The prefiltering chamber comprises, in the perforated bottom, equipped with a plurality of perforations, a lowered portion in the shape of a tub equipped at its bottom with a smaller number of calibrated perforations with respect to those in the remaining part of the perforated bottom. The water level in the tub activates a float valve for controlling the opening and closing of an inflow opening for air from the outside. The inflow opening being closed by the said float valve when the percolator filter is in operation.

BRIEF DESCRIPTION OF THE DRAWING

Further advantages and characteristics of the present invention will become clear from the detailed description that follows, made with reference to the accompanying drawings, which represent a preferred embodiment here illustrated in the form of a non-limiting example, and in which:

FIGURE 1 shows a percolator filter in transversal section according to the present invention.

DESCRIPTION OF THE PREFERRED EMBODIMENTS

The present invention is comprised within a closed receptacle 1 in which, starting from the top and moving downwards, there is a prefiltering chamber 2 defined by a perforated bottom 3, an intermediate chamber 4, a percolation chamber 5 filled with percolating material such as common plastic spheres 6, for the settling of bacterial colonies, and a collection chamber 7 for the regenerated water communicating with an aquarium tank 8 by means of a feed pipe 9. The prefiltering chamber 2 is fed from the outside through a single leader pipe 10 with a mixture of air and water to be regenerated by a pump. The perforated bottom 3 has a lowered portion in the shape of a small tub 3a which is equipped at its bottom with a smaller number of calibrated perforations 3b with respect to the number of perforations 3c in the remaining part of the perforated bottom 3. The level 11 of the water in the small tub 3a activates a float valve 12 for controlling the opening and closing of an inflow opening 13 for air from the outside. The float valve 12 conventionally comprises a float 14, hinged to a pivot 15 by means of a small shaft 16 rigidly bearing an obturator 17.

In FIG. 1, the water level 11 is shown during working conditions, in which the float valve 12 has closed the inflow opening 13 with its obturator 17, preventing the exit of pressurized air from the inside of the percolating filter.

Inside the receptacle, obviously, the air and the water form two strati, one over the other.

Advantageously, the perforated bottom 3 exhibits, in proximity to at least one of the lateral walls of the receptacle 1, at least one overflow projection with an overflow opening 19 in communication with the percolation chamber 5. This avoids the possibility of having an excessive quantity of water in the prefiltering chamber 2 flowing in from the flow pipe 10 in relation to the dripping capacity of the perforations 3c. The collection chamber 7 is connected through the feed pipe 9 to the tank 8. For this reason, as soon as the level of the water has covered an inlet 9a to the collection chamber 7, the internal pressure in the collection chamber will increase until it overcomes the feeding pipe resistance (the feeding pipe is advantageously equipped with a regulatable choke valve 18), and returns a mixture of air and water to the tub 8.

In case of an air-water pump blockage (not shown in the FIGURE) through the flow pipe 10, the small tub 3a in the perforated bottom 3 empties through the calibrated perforations 3b, causing the opening of the inflow opening 13 by the float valve 12. Thus, atmospheric air is introduced into the closed receptacle and the death of the bacterial colony by asphyxia is avoided.

The percolating filter according to the invention can be advantageously associated upstream, by means of the single flow pipe 10 of the water-air mixture to the prefiltering chamber 2, to a pump and to a Venturi tube connected to a water-air collecting device in proximity to the free surface of an aquarium tank, which is an object of another patent application by the same owner of the present invention. Downstream, the percolation filter is connected, through the feed pipe 9 to an aquarium tub 8 by means of a syphon, the specifications of which being envisaged to prevent the flooding of the filter in the percolation chamber 5.

As mentioned above, the prefiltering chamber 2 of the percolator filter, below the level of the flow pipe 10 of the air and water to be regenerated, comprises, in its perforated bottom 3, a lowered portion in the shape of a small tub 3a. The small tub 3a fills with water since the proportion between the load through the perforations 3c of the perforated bottom 3 and the flow of the water of the flow pipe 10 of the mixture is to the advantage of the latter. The small tub 3a in turn is equipped with one or more calibrated perforations 3b so that the small dripping which the calibrated perforations 3b produce with respect to the water they receive does not empty the small tub 3a during normal functioning.

During functioning of the filter, the float valve 12 of the small tub 3a closes the inflow opening 13 from communicating with air from the atmosphere, thus not permitting the exit of air from the inside of the filter. In the case of blockage of the feed pump of water and air, the small tub 3a empties, causing the opening of the float valve 12 and thus allowing air from the atmosphere to pass inside the closed receptacle 1, so as to avoid death of the bacterial colony by asphyxia.

One of the advantages obtained through the present invention is that there is no aerator in the percolator filter, and it is possible to obtain the desired pressure inside the prefiltering chamber 2 only by regulating the air and water outflow from the prefiltering chamber 2. Consequently, a greater solubility of the oxygen is achieved, thus optimizing the work of the bacteria.

The head of the above-mentioned pump ensures that a mixture of atmospheric air and water enters the filtering chamber at a certain pressure. Since in the filter air and water stratify, with the air above and the water beneath, the filtering chamber immediately begins to refill with water and air. In proximity to the bottom, the collection chamber 7 is connected to the feed pipe 9 to supply mixture of air and regenerated water to the tub. For this reason the internal pressure in the collection chamber 7 begins to increase until the pressure overcomes the resistance of the head of the feed pipe 9, equipped with a regulable choke valve 18, and replaces the air-water mixture to the tank. Thus, a continuous exchange of air and water is obtained.

A further advantage of the invention is that carbon dioxide is produced as a catabolite of the bacterial activity. The carbon dioxide is more quickly dissolved in the water, with a consequent benefit for the aquatic plants and algae, because of the pressurized atmosphere.

A still further advantage of the invention is in the fact that the percolator filter can be manufactured in modular form, in a shape made to order for aquariums already in existence on the market.

What is claimed:

1. A pressurized percolating filter for use in regeneration of water in aquariums, comprising in a closed receptacle from top to bottom a prefiltering chamber with a perforated bottom, an intermediate chamber, a percolation chamber filled with a percolation material for settling of bacterial colonies, the intermediate chamber being arranged between said prefiltering chamber and said percolation chamber, a collection chamber for collecting regenerated water, a feed pipe for communicating said collection chamber with an aquarium tank; an inflow opening for admitting air from the outside; pump means for feeding said prefiltering chamber through a single leader pipe from outside with a mixture of air and water to be regenerated, said perforated bottom having a lower portion in a shape of a tub at an elevation which is lower than a remaining portion of said perforated bottom, said lower portion having a smaller number of calibrated holes than that in said remaining portion of said perforated bottom; and a float valve for opening and closing said inflow opening for air admission from the outside by actuating in response to a level of water in said lower portion, said float valve closing said inflow opening in response to said percolator filter being in operation.

2. A filter as in claim 1, wherein said feed pipe includes a regulatable choke valve.

3. A filter as in claim 1, wherein said receptacle has at least one lateral wall, said perforated bottom having, in proximity to said lateral wall, at least one overflow projection with an overflow opening communicating with the percolation chamber.

4. A pressurized percolating filter for use in regeneration of water in aquariums, comprising in a closed receptacle from top to bottom a prefiltering chamber with a perforated bottom, a percolation chamber filled with a percolation material for settling of bacterial colonies, a collection chamber for collecting regenerated water, a feed pipe for communicating said collection chamber with an aquarium tank; an inflow opening for admitting air from the outside; pump means for feeding said prefiltering chamber from outside with a mixture of air and water to be regenerated, said perforated bottom having a lower portion at an elevation which is lower than a remaining portion of said perforated bottom, said lower portion having a smaller number of calibrated holes than that in said remaining portion of said perforated bottom; and a float valve for opening and closing said inflow opening for air admission from the outside by actuating in response to a level of water in said lower portion, said float valve closing said inflow opening in response to said percolator filter being in operation.

5. A pressurized percolating filter for regenerating water in an aquarium comprising:
   a closed receptacle having a top, a bottom and side walls;
   an intermediate wall having a plurality of main holes;
   a prefiltering chamber defined by said intermediate wall and by said top of the closed receptacle;
   an intermediate chamber defined under said intermediate wall;
   a percolation chamber defined under and communicating with said intermediate chamber, said percolation chamber being filled with percolating material for settling bacterial colonies capable of regenerating said water;

a collection chamber defined between said percolation chamber and said bottom of the closed receptacle;

a main pipe engaged to the closed receptacle and feeding a mixture of air and water to be regenerated into said prefiltering chamber;

a pump engaged to the feeding pipe for pressurizing the closed receptacle;

a feed pipe connecting the collection chamber with said aquarium;

said intermediate wall having a lowered portion which defines a tub provided with calibrated holes which number less than a number of said main holes; and a float valve for opening and closing an inflow opening of said closed receptacle, said float valve being operated by water to be regenerated that is present in said tub, said inflow opening being closed by said float valve when the pump is working.

6. A pressurized percolating filter as in claim 5, further comprising an adjustable choke valve engaged on said feed pipe.

7. A pressurized percolating filter as in claim 5, wherein said intermediate wall has at least an overflow projection defining an overflow opening communicating with said percolation chamber.

* * * * *